(12) United States Patent
Switkes

(10) Patent No.: US 10,919,444 B2
(45) Date of Patent: Feb. 16, 2021

(54) SYSTEMS AND METHODS FOR PROVIDING INFORMATION ABOUT VEHICLES

(71) Applicant: Peloton Technology, Inc., Mountain View, CA (US)

(72) Inventor: Joshua P Switkes, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

(21) Appl. No.: 16/255,694

(22) Filed: Jan. 23, 2019

(65) Prior Publication Data

US 2019/0225142 A1 Jul. 25, 2019

Related U.S. Application Data

(60) Provisional application No. 62/621,113, filed on Jan. 24, 2018.

(51) Int. Cl.
*B60Q 1/50* (2006.01)
*G08G 1/00* (2006.01)
*G08G 1/017* (2006.01)

(52) U.S. Cl.
CPC ............ *B60Q 1/50* (2013.01); *G08G 1/017* (2013.01); *G08G 1/22* (2013.01)

(58) Field of Classification Search
CPC ............ B60Q 1/50; G08G 1/017; G08G 1/22
See application file for complete search history.

(56) References Cited

U.S. PATENT DOCUMENTS

| | | | | |
|---|---|---|---|---|
| 6,032,097 A | * | 2/2000 | Iihoshi ................. | G05D 1/0293 701/96 |
| 8,744,666 B2 | * | 6/2014 | Switkes ................. | G08G 1/166 701/28 |
| 9,632,507 B1 | * | 4/2017 | Korn .................... | G05D 1/0295 |
| 9,940,840 B1 | * | 4/2018 | Schubert ................ | B61B 3/00 |
| 2010/0256852 A1 | * | 10/2010 | Mudalige ................ | G08G 1/22 701/24 |
| 2013/0211624 A1 | * | 8/2013 | Lind ........................ | G08G 1/22 701/2 |
| 2014/0172265 A1 | * | 6/2014 | Funabashi ................ | G08G 1/22 701/96 |
| 2014/0195072 A1 | * | 7/2014 | Graumann ............. | B60W 50/14 701/2 |
| 2014/0316671 A1 | * | 10/2014 | Okamoto ................. | G08G 1/22 701/96 |
| 2015/0127189 A1 | * | 5/2015 | Mehr .................. | B60W 30/165 701/1 |
| 2016/0054735 A1 | * | 2/2016 | Switkes .................. | H04W 4/44 701/23 |
| 2016/0171894 A1 | * | 6/2016 | Harvey ................ | G05D 1/0293 701/23 |

(Continued)

*Primary Examiner* — Ryan W Sherwin

(57) ABSTRACT

Aspects of example systems and methods described herein discuss providing indications from a vehicle to other locations based on a variety of attributes. Indications may take the form of an indicator message. Indications may include information associated with whether one or more vehicles are platooning. Indications may be prevented from being distributed if one or more vehicles are not platooning. Law enforcement may be able to receive information indicating whether a vehicle is platooning in order to know whether to issue a ticket to the vehicle.

20 Claims, 5 Drawing Sheets

(56) References Cited

U.S. PATENT DOCUMENTS

| | | | |
|---|---|---|---|
| 2017/0186327 A1* | 6/2017 | Uysal | B60Q 1/00 |
| 2017/0227972 A1* | 8/2017 | Sabau | G08G 1/22 |
| 2018/0120861 A1* | 5/2018 | Saxena | G05D 1/0291 |
| 2018/0137763 A1* | 5/2018 | Deragården | B60W 10/18 |
| 2019/0035283 A1* | 1/2019 | Dudar | G08G 1/22 |
| 2019/0044728 A1* | 2/2019 | Karmoose | G08G 1/22 |
| 2019/0106118 A1* | 4/2019 | Asakura | G08G 1/00 |
| 2019/0206260 A1* | 7/2019 | Pilkington | B60Q 1/44 |
| 2019/0206261 A1* | 7/2019 | Szymczak | B60W 30/165 |
| 2019/0220037 A1* | 7/2019 | Vladimerou | G08G 1/22 |
| 2019/0263404 A1* | 8/2019 | Bergquist | B60W 30/162 |

* cited by examiner

SYSTEMS AND METHODS FOR PROVIDING INFORMATION ABOUT VEHICLES

CROSS-REFERENCE TO RELATED APPLICATIONS

This application claims benefit to U.S. Provisional Patent Application No. 62/621,113, filed Jan. 24, 2018, entitled "INDICATOR FOR VEHICLES". This application claims priority to the aforementioned application, and incorporates it herein in its entirety for all purposes.

BACKGROUND

Enabling a vehicle to follow closely behind one vehicle safely through partial or full automation has significant fuel savings, safety, and/or labor savings benefits, but is generally unsafe when a driver tries to do this manually. Presently, during normal driving, vehicle motion is controlled either manually, by a driver, or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the leading vehicle (also referred to herein as a front vehicle). In general, these cruise control systems provide minimal added safety, and do not have full control of the vehicle (in terms of being able to fully brake or accelerate).

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining an optimal headway as an automated system is. In fact, a driver trying to maintain a constant headway often causes rapid and large changes in command (accelerator pedal position for example), resulting in a loss of efficiency.

Thus, it would be desirable to have reliable and economical semi-automated vehicular convoying/platooning systems which enable vehicles to follow closely together in a safe, efficient, convenient manner.

Moreover, it would be desirable to allow vehicles have to indicate certain actions and intents to the outside world. Typically, these indications include items like turn signals, hazard flashers, brake lights and other external indications. As partial and fully automated connected vehicles become commercialized, the need arises for these vehicles to indicate new or previously known actions and intents using new and/or previously known techniques.

For example, a highway patrol officer, upon seeing two vehicles tailgating, has no immediate way of knowing that the vehicles are in fact using an allowed connected vehicle system (e.g., platooning). This may result in the vehicles being pulled over and interrogated, when in fact nothing illegal had been taking place, delaying the vehicle's travel and wasting the time of the law enforcement officers.

There is therefore a need for a method and/or apparatus that allows legally close-following vehicles to communicate (e.g., provide an indicator) that they are using a legally allowed connected vehicle automation system.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
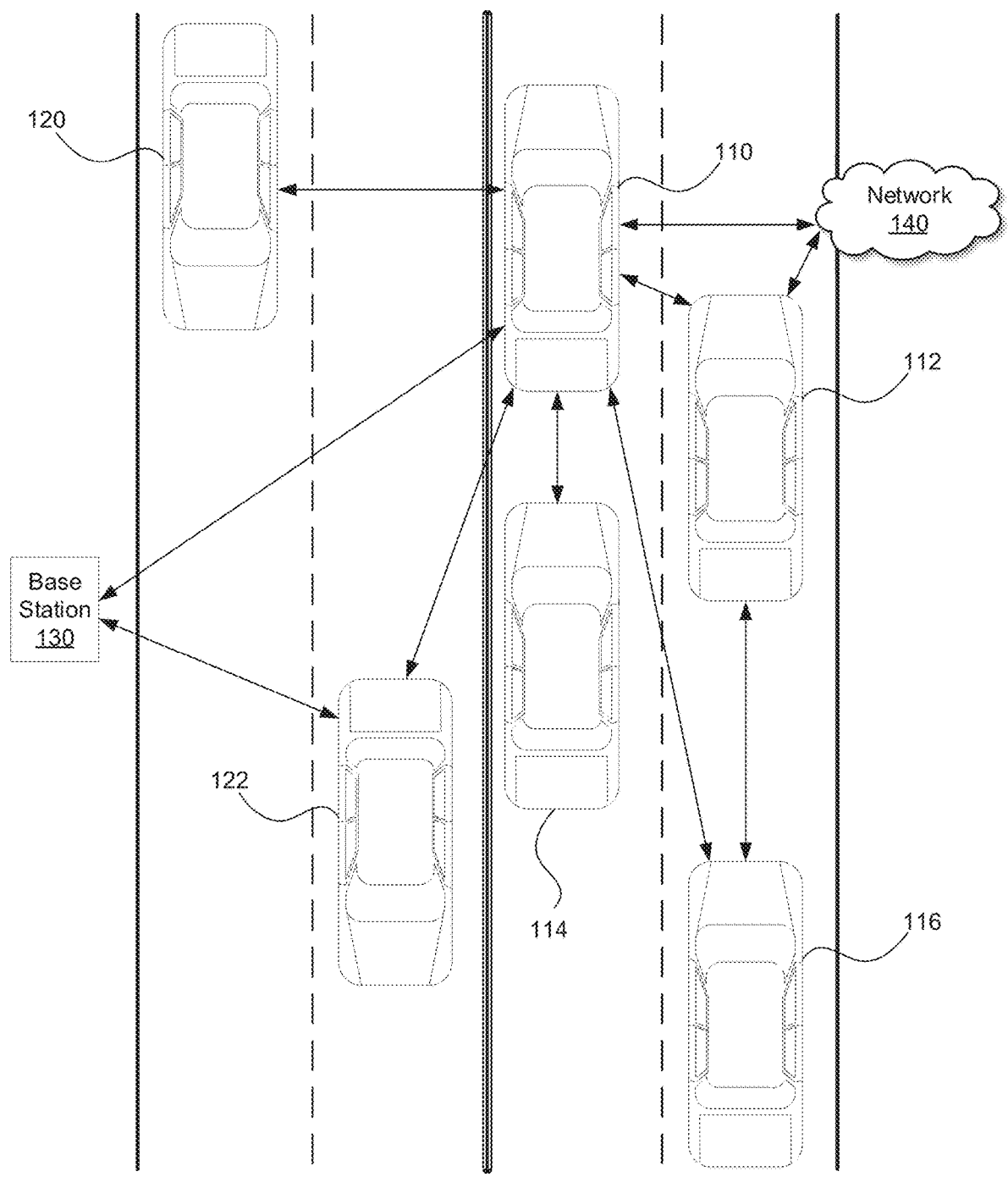
FIG. 1 illustrates a diagram of a platooning system, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practice without implementing all of the features disclosed herein. Further, although many embodiments included in the instant application are related to the concept of platooning, it should be appreciated that many broader applications are envisioned.

In some embodiments included in this application, the terms "automated", "autonomous", "partially automated", "and platooning" may be used interchangeably to indicate a vehicle with one or more automated functions.

Without limitation, the Applicant has proposed various vehicle platooning systems in which a second, and potentially additional, vehicle(s) is/are automatically, or semi-automatically controlled to closely follow a lead/front vehicle in a safe manner. By way of example, U.S. patent application Ser. Nos. 15/605,456, 15/607,902; 13/542,622 and 13/542,627; U.S. Provisional Patent Application Nos. 61/505,076, 62/377,970 and 62/343,819; and PCT Patent Application Nos. PCT/US2014/030770, PCT/US2016/049143, PCT/US2018/41684, PCT/US2017/04771, PCT/US2017/047825 and PCT/US2016/060167 describe various vehicle platooning systems in which a trailing vehicle (also referred to herein as a rear vehicle) is at least partially automatically controlled to closely follow a designated lead vehicle (also referred to herein as a front vehicle). Each of these earlier applications are incorporated herein by reference in their entirety for all purposes.

In the present application, section titles may be used. It should be understood that section titles are not meant to be limiting in any way whatsoever (including with regard to information presented in that section). Section titles are meant to make the instant disclosure easier to read, but should not be construed to indicate that a discussion in one section is not applicable to other sections, and vice versa.

Systems and methods described herein may be directed to vehicles that are platooning, vehicles that are partially or fully autonomous (herein, an autonomous vehicle may refer to any vehicle that is partially or fully autonomous, including platoonable vehicles), and/or any vehicle or any vehicle in a particular situation where this type of indication might be useful. There are many types of parties that might benefit from this type of communication. These include law enforcement, emergency vehicles, other vehicles with similar capabilities, the general motoring public, pedestrians, cyclists, and other road users.

In various embodiments, systems and methods herein, may include communication between vehicles may provide a suitable buffer zone around a platooning and/or automated vehicle. They may include indicators intended to cause vehicles that are not part of a platoon to not cut into a platoon (e.g., go between two vehicles that are platooning.

In some embodiments, an indication (e.g., provided by wireless communication) may provide information (e.g., a notification) to law enforcement or other authorities, which may include information indicating whether one or more vehicles are following a law, what laws may be broken, etc. For example, indications may inform one or more systems (including system users) that a platooning equipped vehicle (also referred to as a platoonable vehicle) may be allowed to follow at a closer distance (and thus not violate various "tailgating laws"). In some embodiments, an automated vehicle may be required to go below a certain speed, or to drive in a given lane, and systems and methods described herein may include indicators that provide information including whether an automated vehicle is traveling below a threshold speed, or is driving in a particular lane (e.g., a lane designated for at least partially automated vehicles (including automated vehicles)). As an example, in some embodiments indicators may provide information indicating that a platooning vehicle may be allowed in the carpool lane, that the platooning vehicle is in a carpool lane, etc.

In some embodiments, vehicle indicators may communicate various attributes associated with a vehicle including, but not limited to a/an: position (e.g., of a vehicle, a paired vehicle, a remote vehicle, a base station, a satellite, etc.), latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), electric motor, battery, super charger, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, tire tread depth, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle). In addition, attributes described herein that may be indicated by a vehicle include information about its own control systems such as the capability of the vehicle (speed range, what obstacles it can or cannot detect, whether it has vehicle to vehicle communication, etc.), or the mode it is in (human driving, system driving, in transition, etc.).

Systems and methods herein describe wireless means to deliver this type of indication to a receiving party (directly and/or indirectly through an intermediary). In various embodiments, a vehicle, or a portion thereof such as an ECU, may receive information from one or more sensors, and provide that information to remote locations wirelessly. Various wireless protocols a vehicle may employ include cellular, Wi-Fi, Bluetooth, optical, DSRC or other RF signals. In various embodiments, such a signal may go from the vehicle to the cloud, directly to a receiving party, or could be relayed by another vehicle.

Each end user of the vehicle indication can receive the information in various ways. In some embodiments, if the end user is in a vehicle, it could receive information via a display or sound within the vehicle. This could occur automatically when in proximity to the vehicle, and/or information could be transmitted and/or displayed in response to a request when near the vehicle (for example when a police officer wants to know the capability of a vehicle near it, it may query to find out). In some embodiments, a user (e.g., an end user such as a policeman) could receive information from and/or about one or more vehicles through a website or other portal. This could be direct or indirect (e.g., direct communication may include communication transmitted from one transceiver to another without traveling through a base station and/or satellite).

In some example systems and methods described herein, a platooning truck sends a wireless signal when it is in an active platoon (e.g., where two vehicles are currently platooning). This signal may be sent via cellular connection to a web server. This web server may be accessible to law enforcement personnel. When a highway patrol officer sees some trucks that appear to be in a platoon, the officer can call back to their colleagues who have access to the web portal, and inquire as to whether the trucks are in fact platooning or are not. It should be understood by one skilled in the art that there are a wide variety of variations of this embodiment, with respect to various aspects including how the data is transferred off the vehicle, to where it is transferred, how it is delivered to the end user, and who that end user is, among other variations.

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

In various embodiments, vehicles 110, 112, 114, 116, 120, and 122 may be configured to platoon, and may platoon with one another. In some embodiments, vehicles may transmit and/or receive data (e.g., to a NOC and/or fleet management system, etc.) including, but not limited to data indicating: whether they are available to platoon; whether they are platooning; whether a platoon they were part of dissolved; what direction they are traveling; what direction they are predicted (e.g., predetermined/planning on/suggested) to be traveling on for a particular period of time; when they are expected to stop (e.g., predetermined to stop, planning on stopping, suggested stopping time); where they plan on stopping; what route(s) they plan to travel (e.g., a route suggested and/or determined by a system, a route determined by a navigation/mapping system based on their destination such a system may be a rendezvousing system, a fleet management system, a navigation system, etc.); what type of platooning system they are equipped with; how many hours they have been on the road; weather they are capable of following the leader (e.g., if one or more vehicles can platoon without a driver); whether they are capable of being the leader in a follow-the-leader system; whether the vehicle is fully autonomous (e.g., capable of level 4 according to the SAE classification system); how much fuel they have saved; how much money they have saved; an area they are allowed to travel within; an area they are not allowed to travel outside of; whether they are capable of platooning on city streets; whether they are only capable of platooning on a highway; whether they are capable of platooning on non-public roads; whether they are capable of platooning in a particular construction site, mine, forest, etc.; and whether other attributes associated with a vehicle's account allows them to platoon. As should be understood, one or more of these attributes may be used to determine whether a vehicle can platoon with one or more additional vehicles, and whether a vehicle should platoon with one or more additional vehicles. It is contemplated that in some embodiments, a system may rank one or more vehicles with which a vehicle should platoon. In such an embodiment, if a target vehicle (e.g., a vehicle with a high ranking) that a first vehicle attempts to platoon with platoons with second vehicle before the first vehicle is able to platoon with the target vehicle, then the first vehicle may select another (e.g., the next) ranked vehicle that the system would like it to (e.g., determines that it should attempt to) platoon with.

In addition to these factors, other information that a vehicle may transmit and/or receive may include data including, but not limited to data associated with a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), whether a vehicle has an electric motor, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle). This information can be used by one or more vehicles, systems, fleets, etc. to determine whether a vehicle may platoon with another vehicle and/or to determine the best vehicle with which a vehicle may platoon. Again, it is contemplated that in some embodiments, a system may rank one or more vehicles with which a vehicle should platoon, and this ranking may be based on vehicle attributes described above. In such an embodiment, if a target vehicle that a first vehicle wishes to platoon with platoons with another vehicle before the first vehicle is able to platoon with the target vehicle, then the first vehicle may move to another (e.g., the next) ranked vehicle that the system would like it to (e.g., determines that it should attempt to) platoon with.

It should be understood that, herein, when a system determines a rendezvous location and/or rendezvous time, that any of these attributes/information/data may be used alone or in combination to determine: whether two or more vehicles can platoon together, a rendezvous location, a rendezvous time, etc.

Figure 2:
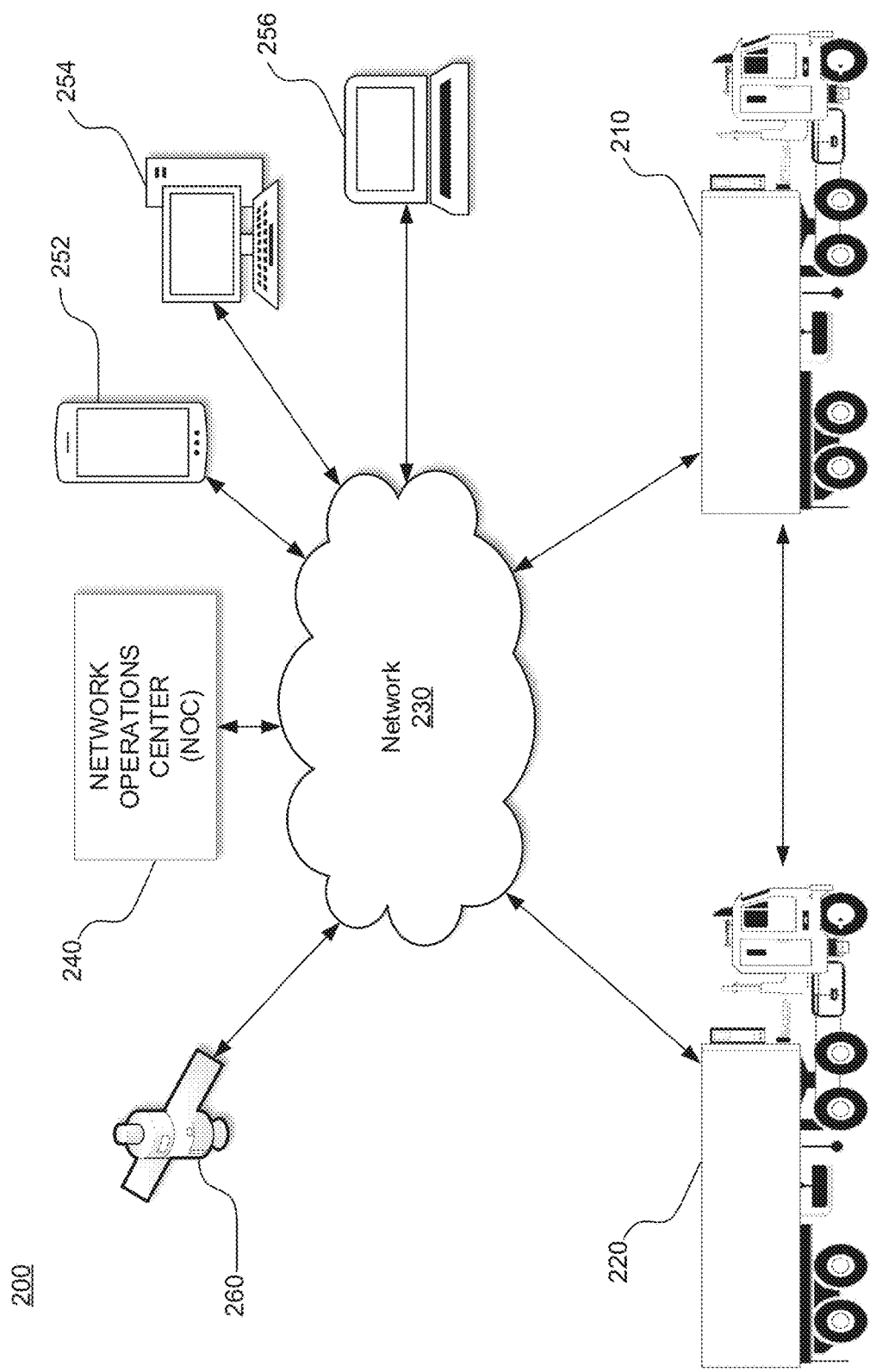
FIG. 2 illustrates a block diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., a NOC may be located in the cloud/a multi-tenant environment). NOC 240 can oversee a complex network of vehicles, satellite communications, cellular networks, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, an amount of applied break, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States's Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
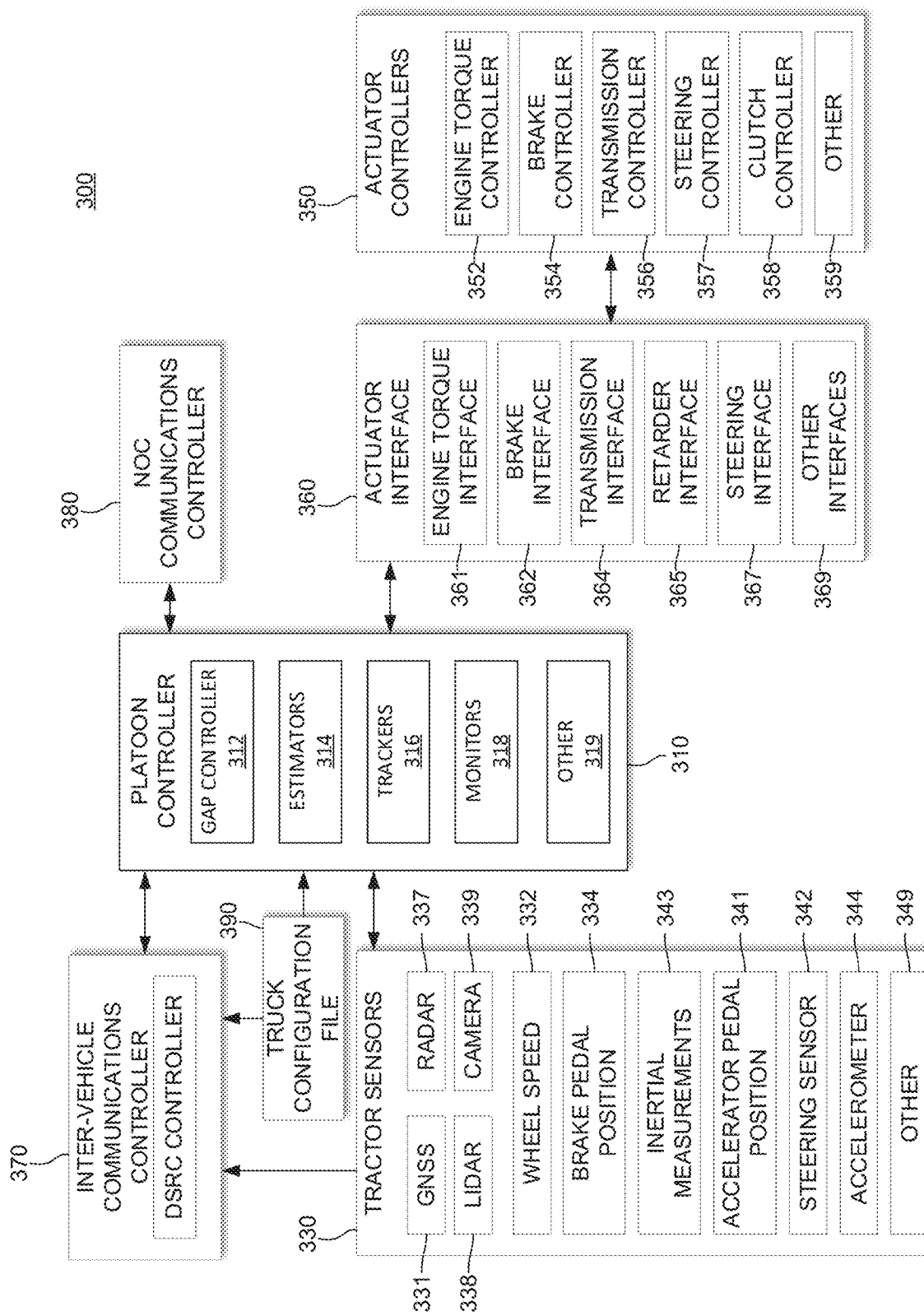
FIG. 3 illustrates a block diagram of a system including an electronic control unit, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chassis controller, or an engine ECU that also controls a retarder-which may obviate the need for a retarder ECU).

Large trucks and other heavy vehicles frequently have multiple systems for "braking" the truck. These include the traditional brake system assemblies mounted in the wheels of the vehicle-which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, DSRC networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc. In some embodiments, configuration file 390 may include information about a driver, a fleet, a fleet's schedule, a driver rating, a driver's ability to use the system, whether a vehicle has permission to use a system, whether a vehicle is certified to use the system, etc.

In various embodiments described herein, an indicator may provide information indicating that closely following vehicles are part of a convoy (also referred to as a platoon).

For vehicles that are using systems that allow connected close following, a method for communicating the close-following status may proceed using the following steps:

For example, a determination may be made that a pair of vehicles are currently platooning, and value may be set for a variable within the software governing these systems that indicates that close following is occurring (for example, setting a designated "platooning bit" to have a value of 1 if platooning, and 0 otherwise).

In some embodiments, communication of that indicator variable value may be transmitted amongst two or more vehicles (e.g., only vehicles that are platooning), or may be transmitted over a long-range communication channel to a network operations-center (NOC), or by broadcasting the information using some form of wireless communication to the region around the vehicles.

An indicator variable may be part of a message and may take a wide variety of different forms. In some implementations, the indicator variable may be as simple as a platoon status flag or other unique conveying code. In other embodiments, a message may include other pertinent information such as: (a) identifying information about the connected or conveying vehicles (e.g., their make, model, color, etc., the vehicle information numbers (VINs) of the conveying vehicles, etc.); (b) information about the automated or autonomous driving, platooning, conveying and/or connected vehicle system(s) in use (e.g. the platform or system in use, the version number, etc.); (c) information about the capabilities of such system; (d) information about the current status of the platoon such as the number of vehicles involved, the target gaps between vehicles, etc.

In some embodiments, if the NOC has received the variable value indicating that the two designated vehicles are engaged in close following, the NOC in turn relays that information over a predetermined communication channel to the state's department of public safety (e.g. the local highway patrol), communicating identifiers for the vehicles such as license numbers, truck identification numbers, etc. with the understanding that these identified vehicles are engaged in legal close following, and should not be disturbed solely due to suspicion of tailgating. This communication may be through dedicated and encrypted channels, or may be broadcast using a secure Internet or web-based interface.

In some embodiments, if the communication is by a local and/or long-range broadcast, a suitably equipped highway patrol car can be configured to pick up the local signals directly, understand that these identified vehicles are engaged in legal close following, and should not be disturbed solely due to suspicion of tailgating. The detection and display may be automatic, or be stored locally after detection for display upon request by the highway patrol officer. A variety of different communication channels may be used to broadcast the communications—as for example, a highway patrol specific channel, or a more general channel such as Bluetooth, Wi-Fi, CB, DSRC, etc. may be used.

Figure 4:
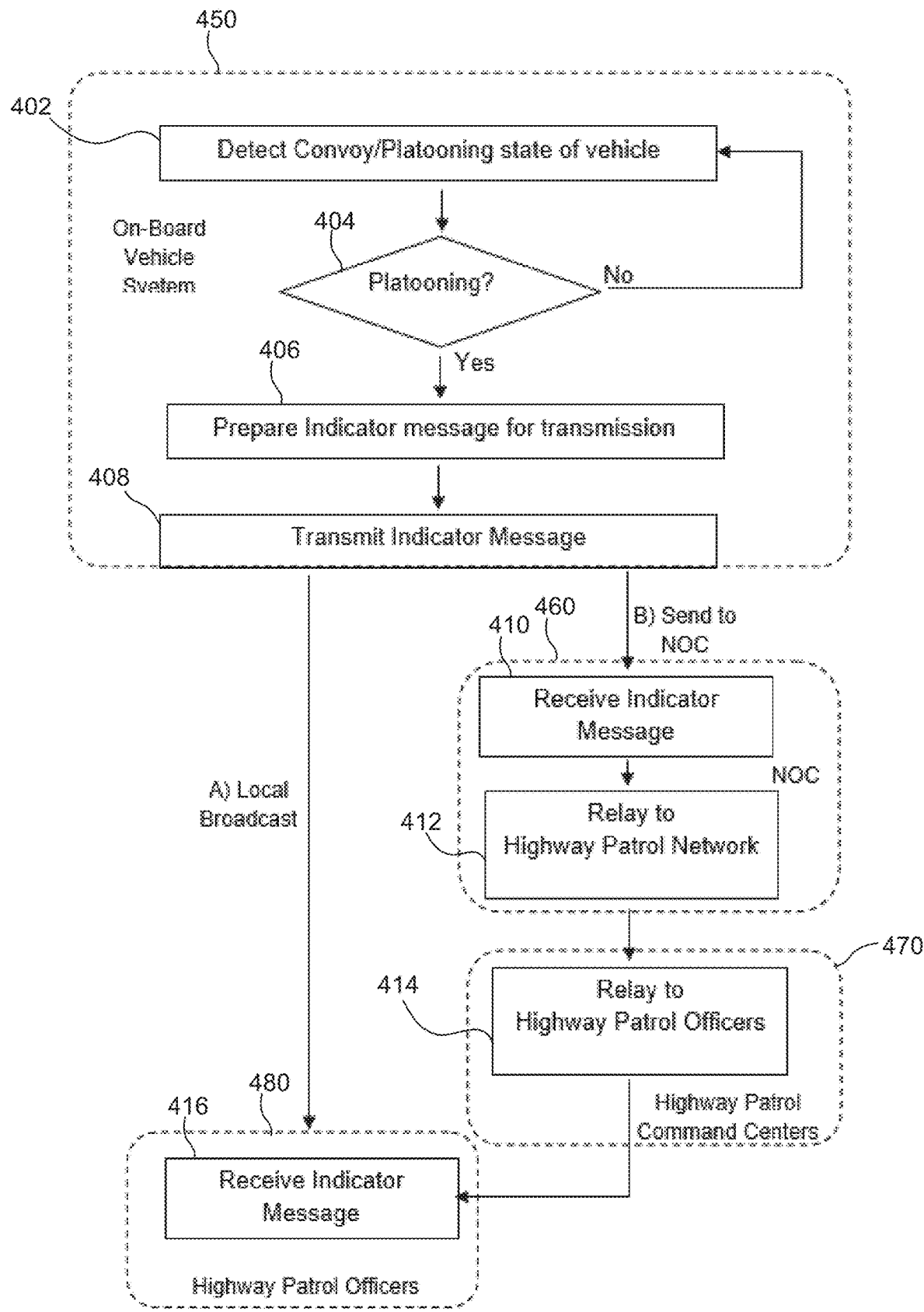
FIG. 4 illustrates a flow chart of an example process, in accordance with some embodiments.

FIG. 4 illustrates a flowchart of an example process, in accordance with some embodiments. Example process 400 includes a method for generating and transmitting an indicator message (e.g., a communication) through both a local broadcast and to the highway patrol through an intermediary such as a network communications center (NOC), in accordance with various embodiments. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 4 should not be construed as limiting the scope of the invention. In one or more embodiments, the steps of FIG. 4 can be performed by example systems 100, 200, 300, and/or computing system 500.

In various embodiments described herein, an indicator message (e.g., a communication) may be transmitted through a local broadcast and to the highway patrol through an intermediary such as a network communications center (NOC).

In step 402, a state of a vehicle may be determined. This state may include whether one or more vehicles are in a platoon or not. In some embodiments, this state may be determined on an on-board vehicle system 450 such as a platooning electronic control unity (PECU), which may be remote from a braking electronic control unit (BECU) and/or an engine electronic control unit (EECU).

In various embodiments, on-board vehicle system 450 resides within at least one of the vehicles, and comprises a mechanism to determine the close following status by reading the "platooning bit" (or other information) that has been set by the system managing the close-following behavior.

In step 404, in response to one or more vehicles not platooning, various systems and methods described herein may cause process 400 to return to step 402. If, however, a determination is made that one or more vehicles are platooning, process 400 may proceed to step 406.

At step 406, an indicator message is prepared for transmission. In other words, a communication that includes information may be prepared at on-board vehicle system 450. In various embodiments, information from various sensors may be collected at on-board vehicle system 450. It should be understood that on-board vehicle system 450 may be located on more than one vehicle, or on only one vehicle. For example, on-board vehicle system 450 may be located on a first vehicle and collect information from sensors on a second vehicle.

At step 408, an indicator message may be transmitted. In some embodiments, vehicles using systems that allow connected close following (e.g., platooning), an apparatus (e.g., a PECU) that may communicate the close following status may comprise a mechanism to broadcast the status of the "platooning bit" to the local environment. Broadcasting the status of the platooning bit may take the form of a wireless broadcast using a short- or medium range wireless system that allows any vehicle within range having suitable detection equipment to detect the wireless signal.

In some embodiments, the apparatus may comprise include a mechanism to turn on "platooning" indicator lights mounted on the tractor and/or trailer, which may then be either flashing or simply on when close following is taking place. These indicator lights may also be marked with a label saying "platooning indicator" or the like, to identify its purpose to other vehicles. In some embodiments, indicator lights may also indicate the partner vehicle or vehicles (the vehicle(s) that are electronically linked to the indicated vehicle). For example, a vehicle that is platooning may activate indicator lights that are (or appear to be) pointing toward another vehicle in a platoon (e.g., pointing via an arrow and/or a chevron). In one embodiment, two vehicles may be included in a platoon, and each vehicle may have indicator lights that point in a direction toward one another while platooning. These lights may also illuminate the road surface or other vehicles, as opposed to just providing light from the vehicle on which it is mounted. For example a light could be used to show an arrow on the road surface to indicate the connection between the two vehicles.

The advantage to this approach is that all suitably equipped nearby vehicles can detect the platooning state of the vehicles, and respond appropriately. No relay of information through a NOC or highway patrol command center is needed, and since wireless communications to these remote locations on long stretches of empty road may be unreliable, the local transmission is more certain of reaching other local vehicles. The disadvantage is that additional broadcast and display indicators must be attached to the platooning equipment.

At step 410 and 416, an indicator message is received (e.g., from on-board vehicle system 450). In some embodiments, detection of the wireless signal may: (1) cause an audio response on a receiver's detection equipment, which may indicate that platooning nearby has been detected; or (2) provide electronic signals (e.g., communications/messages) for presentation on a display connected to a receiver's equipment. In some embodiments, the transmitted electronic signals may simply indicate that platooning vehicles are near, or they may additionally provide the identification information for the vehicles as well as the platooning status. Other information may be provided, as described above. For example, information from a vehicle such as its tire depth or its mass may be provided to a system located at a weigh station, which may transmit that information to another vehicle and/or a centralized (or decentralized) system.

In some embodiments, an indicator message may be sent to a NOC (as shown in FIG. 4). From the NOC, at step 412, in some embodiments, a transmission may be sent to another network, such as a highway patrol network.

At step 414, in some embodiments, an indicator message is received from NOC 460 and relayed to Highway Patrol Officers 480. Step 414 may be performed at a Highway Patrol Command Center 470. Further, it should be understood that an indicator message may be relayed directly from NOC 460 to Highway Patrol Officers (e.g., at their vehicle).

Of course, it should be understood that, in some embodiments, the signals broadcast to the local environment may be encrypted, and may use predetermined encryption standards that allow only law enforcement to read them. Likewise, the wireless communication broadcast to the NOC may be encrypted.

Alternatively, in some embodiments, it may be desirable not to encrypt the messages (or a portion thereof) so other vehicles in the vicinity are aware of the convoying or otherwise connected status of the connected vehicles.

In some embodiments, visible platooning indicator lights may be deployed on a vehicle. In some embodiments indicator lights may be referred to as indicator messages for the purpose of this invention, since they are meant to provide information. In some implementations, the light may not be merely "on" if platooning and "off" if not platooning, but may be, for example, green if platooning or red if not platooning, to prove/indicate that an indicator is not malfunctioning. In some embodiment, signals driving the indicator lights may additionally be modulated to provide a wireless short-range communication channel with anyone having a suitable photodetector on board.

In some embodiments the platooning status indicator lights of the vehicles may be synchronized, and thereby provide another indicia that the vehicles are connected. Such synchronization may take on different forms. By way of example, the color of the lights may be synchronized and/or they may be configured to blink or otherwise flash in synchrony. Of course, a wide variety of other types of synchronization can be used in other embodiments.

Thus, as described herein, the present applications is meant to cover (e.g., protect) indicator messages. Indicator messages may be sent by platooning vehicles, autonomous vehicles (which may include platooning vehicles), or any vehicle with specific capabilities (or a threshold amount of capabilities) and/or one or more specific drivers.

In various embodiments, indicator messages may be transmitted to key stakeholders. Key stakeholders may include law enforcement, emergency vehicles, motorcycles/motorcyclists, the general public, pedestrians, cyclists, and/or other road users. Other stakeholders may include companies such as insurance companies, telematics companies, and/or other government agencies.

As described herein, a wireless signal (which may include one or more indicator messages) may be transmitted from a vehicle via a variety of protocols, including, but not limited to: cellular, LTE, 5G, Wi-Fi, Bluetooth, optically, DSRC, and/or other radio frequencies.

In various embodiments, a signal may take one or more paths. For example, a signal may travel from one or more vehicles to the cloud, and be relayed to one or more other vehicles and/or to any type of receiver.

In some embodiments, an end user of a signal may receive the signal in several ways. For example, an end user may receive the signal may receive the signal (e.g., an indicator message) and have it displayed on a screen or have it cause a sound within, or external to, a vehicle. Various indicator messages may be received automatically when a vehicle is within a certain distance of another vehicle (e.g., the vehicle sending the message, or a vehicle detecting a condition such as a cut-in). In various embodiments, indicator messages may be received when a stakeholder is near a vehicle (e.g., when a highway patrol officer's vehicle is close to a vehicle transmitting (e.g., broadcasting) an indicator message). In some embodiments, an end user may receive indicator messages on a dedicated channel (which may be predetermined, or may be randomly selected). In some embodiments, an end user may query a website or other portal with license plate or other vehicle identifying information. In some embodiments, an end user may be a highway patrol officer, or other user, who may call another location such as a dispatcher, that has access to indicator messages transmitted from on-board vehicle system 450.

In some embodiments, indicator messages may be sent to at least one location/device for at least one purpose. For example, indicator messages may be sent to systems at weigh stations. Such information may include a vehicle's, and/or a platoon of vehicles's mass. In some embodiments, information associated with a platoonable vehicle may be transmitted to a base station, which may be a part of a city's infrastructure such as a traffic light, a cellular tower, a street light (e.g., wherein a receiver and/or transceiver may be located within a pole with a light at the top), an electric vehicle charger, etc. In some embodiments, a part of a city's infrastructure (e.g., a street light that comprises an electric vehicle charger) may receive information about at least one vehicle (e.g., a platoon) such as if a vehicle is configured to platoon.

In some embodiments, indicator messages may be shown on screens external to a vehicle. For example, indicator messages may play advertisements (e.g., for a product associated with the vehicle, such as a product a truck is hauling). In some examples, a screen may indicate that a user's food is ready to be removed from a vehicle. For example, a vehicle may be delivering food or groceries and be able to transmit indicator messages (e.g., via a screen) to a user outside of the vehicle. In some embodiments, a screen may notify a user that a code must be entered, or a signal must be received (e.g., a near-field conduction signal which may be from a smartphone or watch).

In some embodiments, a vehicle may transmit information about the health of a driver to another location. For example, a vehicle may be able to determine the pulse of a driver, or another attribute indicative of health, and provide that information to another vehicle (e.g., another vehicle in the platoon), a remote terminal (e.g., a fleet control center), to emergency services and/or police units. Such an indicator message may save lives. For example, in response to the detection of adverse health of a driver and/or passenger in a rear vehicle, a front vehicle may receive information associated with the detection, and/or cause the rear vehicle to change states (e.g., from semi-autonomous mode (e.g., wherein a front vehicle controls and/or commands a rear vehicle's speed/torque/relative distance/throttle/brakes but not steering) to a more autonomous mode (e.g., follow-the-leader mode, wherein a lead vehicle controls and/or commands a rear vehicle's speed/torque/relative distance/throttle/brakes and steering) mode to a fully autonomous mode (e.g., where a vehicle may operate without a driver and/or without another vehicle sending it commands).

Information that may be included in a message indicator about a first platoonable vehicle and/or a second platoonable vehicle may include, but is not limited to: a distance traveled, a distance platooned, a distance/time/location traveled being paired, a distance/time/location traveled not being paired, a distance/time/location traveled while being authorized to platoon, a distance/time/location traveled while not being authorized to platoon, a distance/time/location while platooning, a distance/time/location while not platooning, etc.

Other information about a vehicle that may be transmitted within an indicator message may include, but is not limited to a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), electric motor, battery, super charger, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, tire tread depth, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle).

Figure 5:
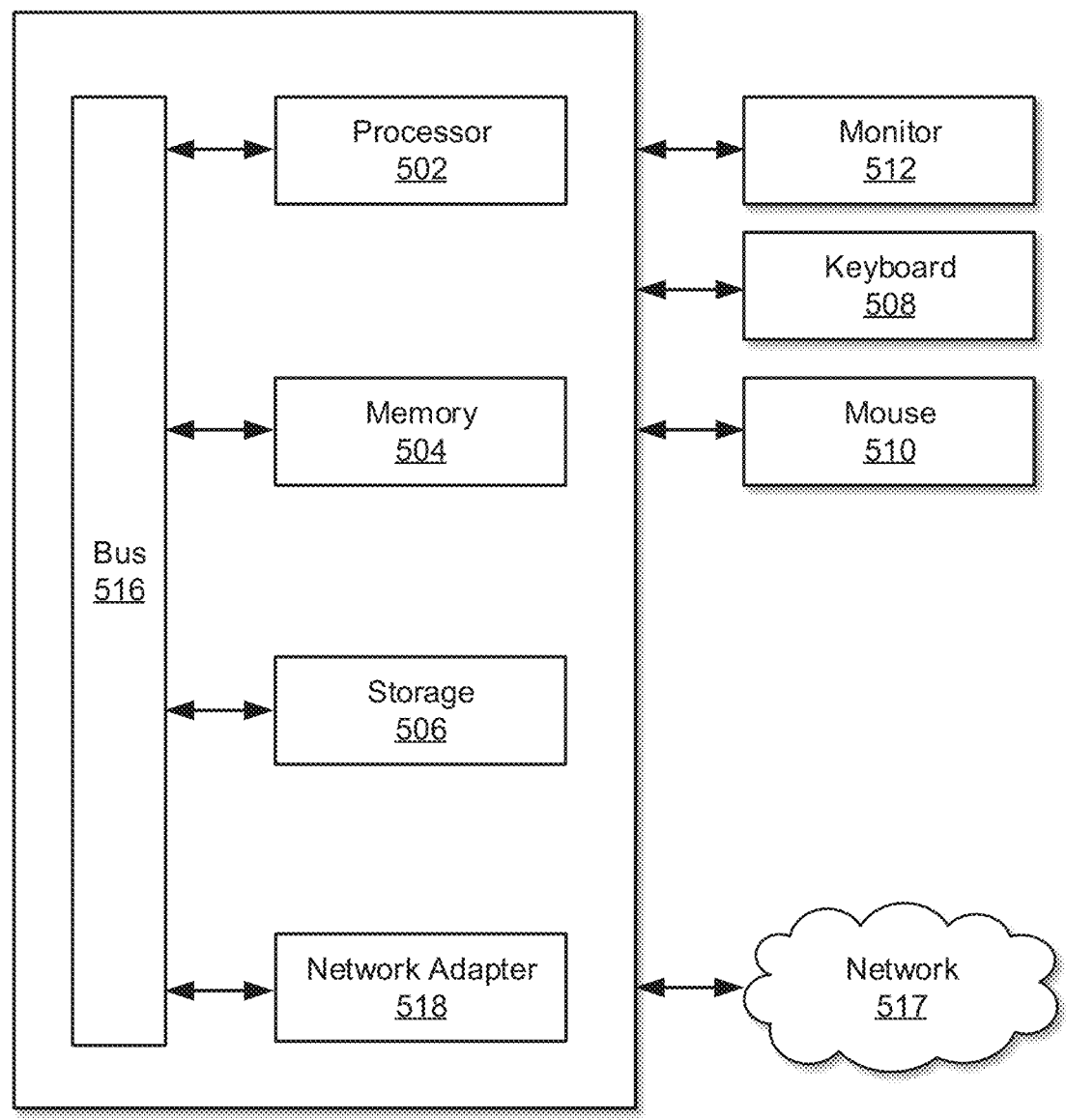
FIG. 5 illustrates an example computing system, in accordance with some embodiments.

FIG. 5 illustrates an example computing system, in accordance with some embodiments.

In various embodiments, the calculations performed above may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC and to one or more processors. According to various aspects, each of these items may include various kinds of memory, including non-volatile memory, to store one or more programs containing instructions for performing various aspects disclosed herein.

For example, as shown in FIG. 5, example computing system 500 may include one or more computer processor(s) 502, associated memory 504 (e.g., random access memory (RAM), cache memory, flash memory, read only memory (ROM), electrically erasable programmable ROM (EEPROM), or any other medium that can be used to store the desired information and that can be accessed to retrieve that information, etc.), one or more storage device(s) 506 (e.g., a hard disk, a magnetic storage medium, an optical drive such as a compact disk (CD) drive or digital versatile disk (DVD) drive, a flash memory stick, etc.), and numerous other elements and functionalities. The computer processor(s) 502 may be an integrated circuit for processing instructions. For example, the computer processor(s) may be one or more cores or micro-cores of a processor. The computing system 500 may also include one or more input device(s) 510, such as a touchscreen, keyboard, mouse, microphone, touchpad, electronic pen, or any other type of input device. Further, the computing system 500 may include one or more output device(s) 508, such as a screen (e.g., a liquid crystal display (LCD), a plasma display, touchscreen, cathode ray tube (CRT) monitor, projector, or other display device), a printer, external storage, or any other output device. The computing system 500 may be connected to a network 514 (e.g., a local area network (LAN), a wide area network (WAN) such as the Internet, mobile network, or any other type of network) via a network interface connection 518. The input and output device(s) may be locally or remotely connected (e.g., via the network 512) to the computer processor(s) 502, memory 504, and storage device(s) 506.

One or more elements of the aforementioned computing system 500 may be located at a remote location and connected to the other elements over a network 514. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A method indicating that a first connected vehicle of one or more connected vehicles is traveling in at least a partially automated status, comprising:
   transmitting an indication of at least some of a first connected vehicle's capabilities and/or at least a portion of the first connected vehicle's status to nearby vehicles that are not one of the one or more connected vehicles;
   transmitting the indication of the at least some of the first connected vehicle's capabilities and/or the at least a portion of the first connected vehicle's status to a remote server or a network operations center (NOC), wherein the remote server or the NOC are configured to provide the at least some of the first connected vehicle's capabilities and/or the at least a portion of the first connected vehicle's status to a third party.

2. The method of claim 1, wherein the third party consists of law enforcement.

3. A method for providing an indicator message, comprising:
   detecting whether a first vehicle is platooning;
   in response to the first vehicle not platooning:
      continuing to monitor whether the first vehicle is platooning; and
   in response to the first vehicle platooning:
      preparing an indicator message for transmission, wherein the indicator message is generated at an on-board vehicle system and the indicator message is transmitted to a network operations center (NOC), a highway patrol command center, and a highway patrol vehicle; and
      transmitting the indicator message.

4. The method of claim 3, wherein the indicator message is transmitted regardless of whether the first vehicle is not platooning or the first vehicle is platooning.

5. The method of claim 3, wherein the on-board vehicle system is within the first vehicle, and wherein the indicator message is based at least in part on sensor information gathered by sensors located at a second vehicle.

6. The method of claim 5, wherein the on-board vehicle system within the first vehicle is a platooning electronic control unit (PECU), and wherein the PECU is remote from a brake electronic control unit (BECU) and an engine electronic control unit (EECU).

7. The method of claim 3, wherein the indicator message is transmitted via a frequency or channel dedicated to law enforcement.

8. The method of claim 3, wherein the indicator message includes a weight of two or more vehicles in a platoon, wherein the platoon includes the first vehicle.

9. A system for transmitting indicator messages, comprising:
   two or more vehicles capable of platooning, wherein each of the two or more vehicles comprises an on-board vehicle system configured to transmit indicator messages, wherein the on-board vehicle system comprises a platooning electronic control unit (PECU), wherein the PECU is remote from a brake electronic control unit (BECU) and/or an engine electronic control unit (EECU), and wherein the PECU is configured to transmit the indicator message to a network operations center (NOC) and a law enforcement vehicle.

10. The system of claim 9, wherein the indicator messages include information indicating a platooning status of one of the two or more vehicles.

11. The system of claim 9, wherein the NOC is configured to transmit the indicator message to a law enforcement control center, and wherein the law enforcement control center is configured to transmit the indicator message to law enforcement officers remote from the law enforcement control center.

12. The system of claim 9, wherein the indicator message includes a weight of each of the two or more vehicles and the axle weights of each of the two or more vehicles.

13. A method for providing an indicator message, comprising:
   detecting whether a first vehicle is platooning;
   in response to the first vehicle not platooning:
      continuing to monitor whether the first vehicle is platooning; and
   in response to the first vehicle platooning:
      preparing an indicator message for transmission; and
      transmitting the indicator message, wherein the indicator message is transmitted by activating indicator lights, and wherein the indicator lights are located at least on the first vehicle.

14. The method of claim 13, wherein the indicator message transmitted by the indicator lights indicates a second vehicle that is platooning with the first vehicle.

15. The method of claim 13, wherein the indicator lights that indicate the second vehicle that is platooning with the first vehicle appear to be pointing in a direction of the second vehicle when activated.

16. The method of claim 13, wherein the indicator message is transmitted regardless of whether the first vehicle is not platooning or the first vehicle is platooning.

17. The method of claim 13, wherein the on-board vehicle system is within the first vehicle, and wherein the indicator message is based at least in part on sensor information gathered by sensors located at a second vehicle.

18. The method of claim 17, wherein the on-board vehicle system within the first vehicle is a platooning electronic control unit (PECU), and wherein the PECU is remote from a brake electronic control unit (BECU) and an engine electronic control unit (EECU).

19. The method of claim 13, wherein the indicator message is transmitted via a frequency or channel dedicated to law enforcement.

20. The method of claim 13, wherein the indicator message includes a weight of two or more vehicles in a platoon, wherein the platoon includes the first vehicle.

* * * * *